C. E. WHEELER.
Assignor to J. BOYLE.
Process and Apparatus for Painting Striped Awnings in Oil Colors.
No. 8,430. Reissued Sept. 24, 1878.
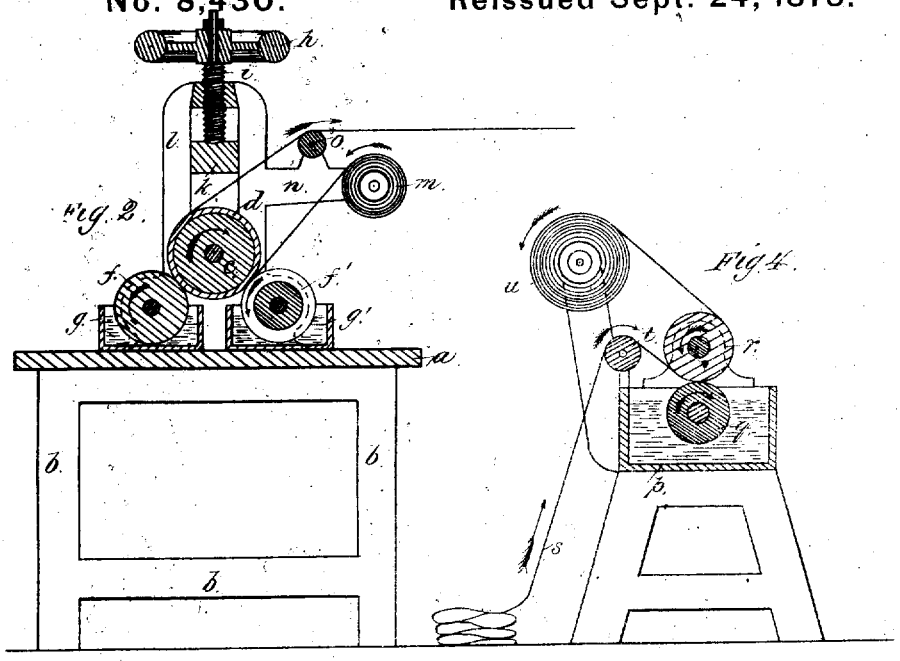
Fig. 1
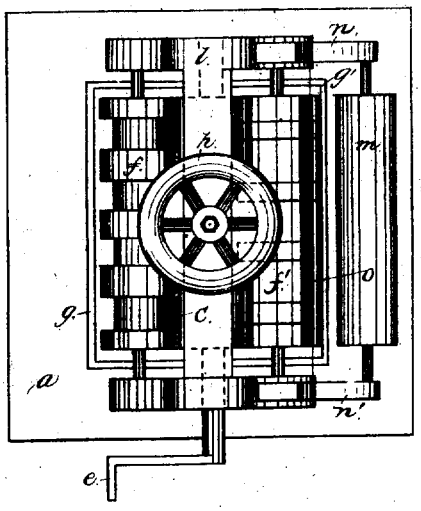
Fig. 3
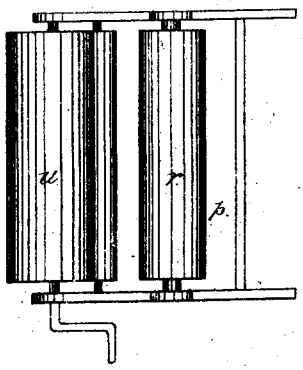
Attest:
Geo. T. Smallwood Jr
Walter Allen
Inventor:
Charles E. Wheeler
By Knight Bros attys.

UNITED STATES PATENT OFFICE.

CHARLES E. WHEELER, OF BOSTON, MASSACHUSETTS, ASSIGNOR TO JOHN BOYLE, OF NEW YORK, N. Y.

IMPROVEMENT IN PROCESSES AND APPARATUS FOR PAINTING STRIPED AWNINGS IN OIL-COLORS.

Specification forming part of Letters Patent No. 138,773, dated May 13, 1873; Reissue No. 8,420, dated September 24, 1878; application filed August 24, 1878.

DIVISION A.

*To all whom it may concern:*

Be it known that I, CHARLES E. WHEELER, of Boston, in the county of Suffolk and State of Massachusetts, have invented a certain new and Improved Process and Apparatus for the Manufacture of Striped Cloth for Awnings; and I do hereby declare the following to be a full, clear, and exact description of the invention, such as will enable others skilled in the art to which it pertains to make and use it, reference being had to the accompanying drawings, which form part of this specification.

My invention relates to improvements in the manufacture of striped cloth for awnings, tents, &c., consisting in striping white cloth with oil-colors by means of one or more painting-rollers partially immersed in one or more boxes containing the color with which the cloth is to be striped, in combination with a pressure-roller, between which and the paint-roller the cloth is drawn.

Before the cloth is striped I pass it through a sizing-machine containing water, or a solution of soap or alkalies, for the purpose of preventing the oil-paint from spreading, and also to prevent too great an absorption of oil by the cloth. After the cloth has been striped it is hung up to dry, and is then ready for use in the manufacture of tents, awnings, &c.

In the drawing, Figure 1 is a ground plan of the coloring-machine. Fig. 2 is a cross-section of the same. Fig. 3 is a ground plan of the sizing apparatus, and Fig. 4 represents a cross-section of Fig. 3.

Similar letters refer to corresponding parts wherever they occur on the drawing.

*a* on the drawing, Figs. 1 and 2, is the table, supported on a suitable frame-work, *b b*, as shown. *c* is a plain cylindrical roller, covered on its circumference with an elastic annular ring, *d*. The cylinder *c* is movable in bearings at each end, and provided at one end with a crank, *e*, or its equivalent, by which said roller is set in rotary motion. *f f'* are the rollers that convey the oil-paint from the boxes *g g'* to the cloth as it passes between the roller *c* and the coloring-rollers *f f'*. The said rollers *f f'* are partially immersed in the oil-paint in the boxes *g g'*, as shown in Fig. 2, and are made to revolve loose in suitable bearings. The friction-roller *c d* can be pressed more or less in contact with the paint-rollers *f f'* by means of the wheel *h*, screw *i*, and beam *k*. The roller *c d* is for this purpose supported in movable bearings, that may slide up or down in a slot in each of the standards *l l'*. The rollers *f f'* may be made of any desirable shape, according to the number and width of the stripes that are to be painted on the cloth. *m* is the roller on which the cloth is wound in the sizing-machine, which will hereinafter be described. The roller *m* is made to run in bearings *n n'* attached to the standards *l l'*, or any other stationary part of the machine, as may be practical. Any suitable arrangement, such as a weight, spring, &c., may be used to increase the tension on the roller *m*, so that the cloth may be delivered evenly to the rollers *c f f'*. *o* is a small guide-roller, for the purpose of properly guiding the painted cloth from the machine to the drying-rack.

The sizing apparatus is fully shown in Figs. 3 and 4, and is constructed as follows: *p* is a suitable trough, containing water or a weak solution of soap or alkalies. The roller *q* is partially immersed in the liquid, and made to revolve loosely in bearings in the ends of the trough *p*. Another roller, *r*, is also made to revolve loosely in bearings attached to the trough *p*; but the latter roller is not at all immersed in the liquid. The cloth *s* passes over a guide-roller, *t*, and between rollers *q r*, where it is sized sufficiently to prevent the oil-paint from spreading. The cloth is then wound upon the roller *u*. The roller *u*, with the damp cloth wound upon it, is afterward placed in the position marked *m* on Fig. 2, and the cloth is now ready to pass between the painting-rollers *f f'* and elastic roller *c d*, as heretofore described.

It is essential to the perfect working of the apparatus that the cloth be carried around the surface of a single pressure-roller or drum, *c d*, in contact with one or more painting-rollers, so that the fabric will not be stretched in a plane, but will present a convex surface to the action of the painting-roller.

Having thus described my invention, the following is what I claim as new therein and desire to secure by Letters Patent:

1. The combination, with the pressure-roller *c*, screw *h i*, and bar *k*, or their equivalents, of one or more pattern-rollers, *f f'*, partially immersed in the oil-paint contained in the box or boxes *g g'*, for the purpose of striping cloth for awnings, &c., as herein shown and described.

2. In combination with the oil-striping apparatus herein described, the sizing-machine consisting of the trough *p*, immersed roller *q*, and rollers *t*, *r*, and *u*, as and for the purpose set forth.

3. The process of painting stripes in oil-color on duck or other suitable fabric for awnings or tents by passing the same between a pressure-roller and a painting-roller, the latter of which is partially immersed in the color, substantially as set forth.

CHARLES E. WHEELER.

Witnesses:
HENRY A. FOLSOM,
MICHAEL E. SULLIVAN.